United States Patent [19]
Duchet

[11] 3,989,360
[45] Nov. 2, 1976

[54] OPTICAL DEVICE

[75] Inventor: Michel Duchet, Briis-sur-Forges, France

[73] Assignee: Compagnie Generale d'Electricite, Paris, France

[22] Filed: Sept. 29, 1975

[21] Appl. No.: 617,604

[30] Foreign Application Priority Data
Sept. 30, 1974    France ........................ 74.32862

[52] U.S. Cl. ............... 350/319; 331/94.5 C; 331/94.5 D; 350/93
[51] Int. Cl.² ....................................... G02B 27/00
[58] Field of Search ............. 350/63, 93, 310, 288, 350/319; 331/94.5 C, 94.5 D, 94.5 T; 165/107

[56] References Cited
UNITED STATES PATENTS

| | | | |
|---|---|---|---|
| 3,580,658 | 5/1971 | Swanson | 350/93 |
| 3,614,652 | 10/1971 | Nicolai | 331/94.5 C |
| 3,652,954 | 3/1972 | Snitzer | 331/94.5 D |
| 3,894,795 | 7/1975 | Laurens | 350/288 X |

*Primary Examiner*—John K. Corbin
*Assistant Examiner*—Matthew W. Koren
*Attorney, Agent, or Firm*—Sughrue, Rothwell, Mion, Zinn & Macpeak

[57] ABSTRACT

Optical device comprising two optical elements made of germanium arranged parallel to each other and intended to have a high-power $CO_2$ laser beam crossing through them; helium at low temperature flows between the two optical elements and a dry nitrogen flux is directed towards at least one of the input and output faces of the device.

6 Claims, 1 Drawing Figure

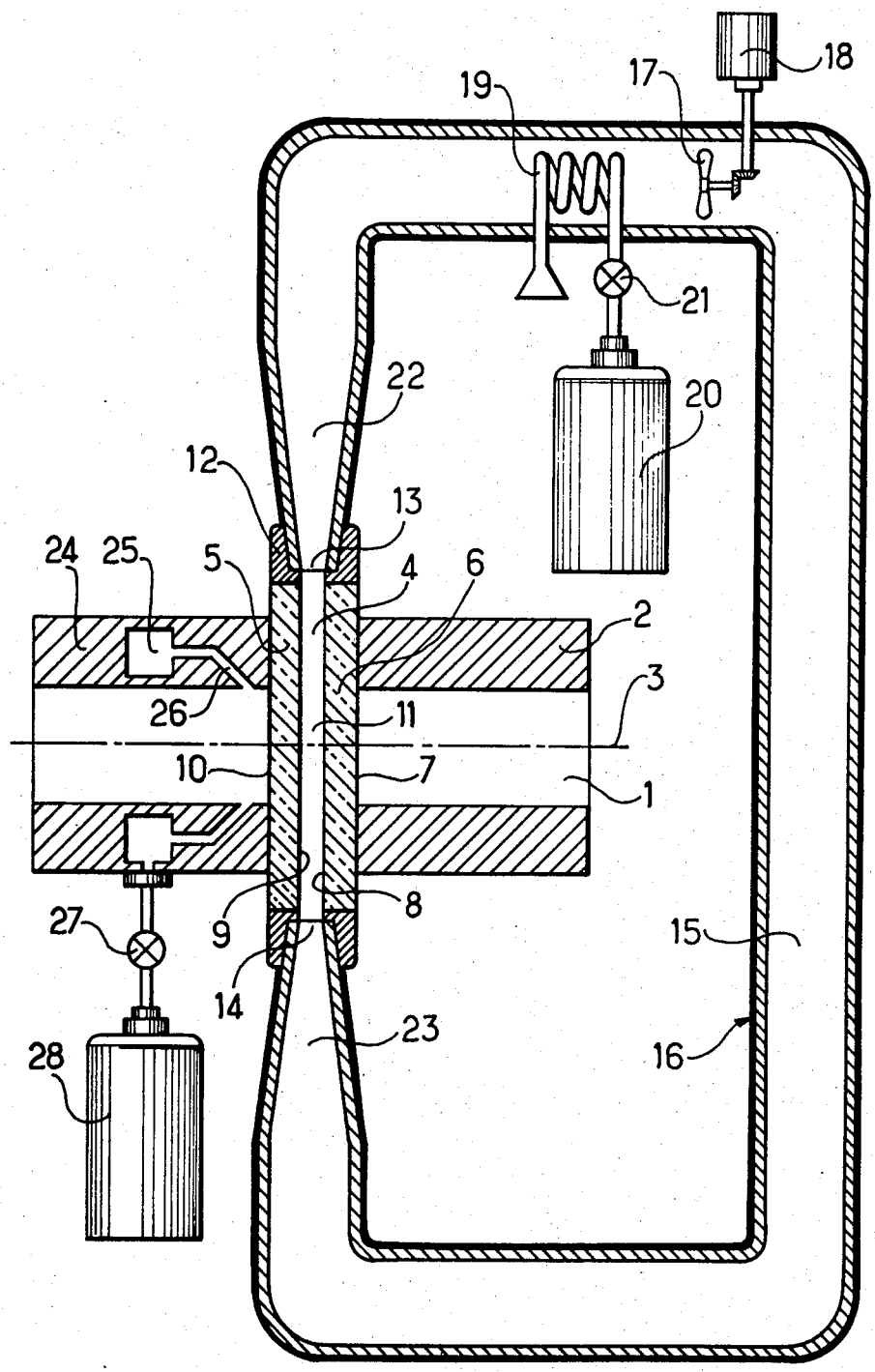

OPTICAL DEVICE

The present invention concerns optical devices and more particularly optical devices intended to have a light beam with a wavelength of about 10.6 microns, obtained, for example, by means of a carbon dioxide laser, crossing through it.

The problem arises more particularly for forming an optical window arranged in a laser head to allow the light beam produced by an active gaseous mixture contained in that head to pass.

The problem arises also when it is required to form a lens for focussing a laser beam having the above-mentioned wavelength.

It is known that these optical devices are made of a material which is transparent to that wavelength, for example germanium or certain semiconductor compounds formed by arsenic-gallium, cadmium-telluride or zinc-selenium mixtures.

Certain of these materials have the disadvantage of having a coefficient of light absorption which increases when the temperature increases. If they are used without particular precautions for forming an optical device intended to have a high-power light beam crossing through them, the over-heating undergone by that device has a tendency to increase as the light beam passes. A thermal runaway phenomenon is observed and the optical device is rapidly destroyed by overheating.

Moreover, when these materials are used for producing optical devices and when it is sought to cool them to avoid the thermal runaway phenomenon, the dampness of the ambient air is deposited on the faces of the device to form a layer of steam or frost which absorbs a great part of the energy of the light beam.

The aim of the present invention is to overcome these disadvantages and to produce an optical device made of one of the above-mentioned semiconductive materials provided with means for avoiding overheating when it is crossed by a high-power light beam. Another aim of the present invention is to produce a device which keeps its optical qualities intact whatever the degree of hygrometry of the ambient air may be.

The present invention has as its object an optical device comprising two optical elements each having two optical faces centred on a same axis, that device being intended to be crossed, along the said axis, by a light beam whose wavelength is about 10.6 microns, the faces of the said elements being coated with a non-reflecting layer for the said wavelength, one of the faces of each element being plane, the said elements being arranged so that these plane faces be adjacent to each other, the said plane faces having substantially identical dimensions, the other faces of the said elements forming, respectively the input and output faces of the optical device, the said optical elements being made of a material selected from among germanium, a mixture of arsenic and of gallium, a mixture of cadmium and of telluride and a mixture of zinc and of selenium, characterized in that it comprises means for making a cooling fluid which is transparent to the light of the said beam flow in the space comprised between the said plane faces, that flow taking place in a direction substantially perpendicular to the said axis and means for directing onto at least one of the said input and output faces a flux of dry gas which is transparent to the said light.

The invention is described hereinbelow with reference to the accompanying drawing given by way of an illustration but having no limiting character, in which the single FIGURE shows an embodiment of the device according to the invention.

In that FIGURE, reference 1 designates a laser head filled with carbon dioxide limited by a cylinder 2. The laser head 1 is capable of emitting a light beam a wavelength of 10.6 microns along the axis 3 of the cylinder 2. To enable the light beam emerge, a window 4 having two disks 5 and 6 made of polycrystalline germanium centred on the axis 3, having substantially identical diemensions is provided. One face 7 of the disk 6 constituting the input face of the window 4 is pressed against a base of the cylinder 2, it being possible to arrange an O ring, not shown, between that base and the face 7 to provide gas-tight sealing. The plane face 8 of the disk 6 is arranged adjacent to a plane face 9 of the disk 5 and the other face 10 of the disk 5 forms the output face of the window 4.

For a diameter of 30 cm of the window 4, the thickness of the disks is 5 mm and the distance between the faces 8 and 9 is in the order of 1 mm. The faces 7, 8, 9 and 10 are coated with a material which does not reflect light having a wavelength of 10.6 microns, in order to avoid any loss of energy of the laser beam emitted by the head 1. To cool the window 4, a cooling fluid which is, to great advantage, helium at a very low temperature, is made to flow in the space 11 comprised between the faces 8 and 9, perpendicularly to the axis 3. For that purpose, a sleeve 12 is fixed on the inside on the edges of the disks 5 and 6, so as to surround the space 11. The sleeve 12 is provided with an input opening 13 and an output opening 14 for the cooling fluid. These openings are connected up respectively to the two ends of a duct 15 filled with helium and having an outside wall which can, to great advantage, be coated with a thermally insulating layer 16. A wind machine consisting of at least one fan 17 driven in a rotating movement by means of a motor 18 is arranged on the inside of that duct to make the helium flow in the direction of the output opening 14 towards the input opening 13. A heat exchanger which can be constituted by a coiled tube 19 connected up to a liquid nitrogen cylinder 20 by means of a valve 21, is arranged on the path of the helium, in the duct 15. A connecting element 22 and 23, having a truncated cone shape so as to effect a progressive decrease in the cross-section of the flow of the helium from the said end to the said opening can be provided between each opening 13 and 14 and the corresponding end of the duct 15.

To prevent the forming of frost on the output face 10 of the window 4, a flux of dry gas such as nitrogen is directed onto that face. For that purpose, a sleeve 24 comprising, in its wall, an annular chamber 25 from which several channels such as 26 which are oblique in relation to the plane of the face 10 of the disk 5 and converge towards that face, is used. The annular chamber 25 is connected through a valve 27 to a nitrogen cylinder 28.

When the valve 21 is opened to make liquid nitrogen flow in the coiled tube 19 and the ventilator 17 is started up, a flow of helium at low temperature is set up in the space 11 comprised between the disks 5 and 6. The discharge of liquid nitrogen in the coiled tube 19 can be regulated so as to obtain, for example, a temperature of 90° Kelvin for the flowing helium. If the speed of the helium is sufficiently great (corresponding, for example, to a discharge of 10 cu. m. per second), a turbulent flow of helium between the faces 8 and 9 of the disks 6 and 5, this promoting heat exchanges at the level of the faces 8 and 9 and therefore the cooling of the disks 6 and 5. In these conditions, the laser power which can be transmitted through the window 4 can each 100 kW in continuous pulse operation and 500 kW for a light pulse lasting 10 seconds.

The optical device according to the invention can be constituted by a laser window, such as illustrated in the FIGURE. Likewise, it is possible to produce an optical lens. In that case, at least one of the input and output faces of the device is curved instead of being plane and the laser head is no longer pressed against the input face of the device. The latter then comprises means for projecting against that input face a flux of dry gas in order to avoid the forming of frost on that face, those means being absolutely analogous to those shown in the single FIGURE which are relative to the output face of the laser window.

The device according to the invention can be applied more particularly to carbon dioxide type high-power laser generators.

I claim:

1. Optical device comprising two optical elements each having two optical faces centred on a same axis, that device being intended to be crossed, along the said axis, by a light beam whose wavelength is about 10.6 microns, the faces of the said elements being coated with a non-reflecting layer for the said wavelength, one of the faces of each element being plane, the said elements being arranged so that these plane faces be adjacent to each other, the said plane faces having substantially identical dimensions, the other faces of the said elements forming, respectively, the input and output faces of the optical device, the said optical elements being made of a material selected from among germanium, a mixture of arsenic and of gallium, a mixture of cadmium and of telluride and a mixture of zinc and of selenium, characterized in that it comprises means (12 to 25) for making a cooling fluid which is transparent to the light of the said beam flow in the space (11) comprised between the said plane faces (8, 9), that flow taking place in a direction substantially perpendicular to the said axis (3) and means (24 to 28) for directing onto at least one of the said input and output faces (10) a flux of dry gas which is transparent to the said light.

2. Device according to claim 1, characterized in that said input face (7) and output face (10) are plane, with a view to the producing of an optical window (4).

3. Device according to claim 1, characterized in that at least one of the said input and output faces (7, 10) is curved, with a view to producing an optical lens.

4. Device according to claim 1, characterized in that the said means (12 to 21) for making a cooling fluid flow in the space (11) comprised between the said plane faces (8, 9) comprise a sleeve (12) fixed on the inside on the edges of the said elements (5, 6) and surrounding the said space (11), that sleeve being provided with an input opening (13) and an output opening (14), a duct (15) filled with the said fluid, the ends of that duct (15) being connected up respectively to the said input and output openings (13, 14), at least one fan (17) arranged in the said duct (15) for making the said fluid flow inside that duct (15) from the said output opening (14) to the said input opening (13) and a heat exchanger (19) arranged inside the said duct (15) on the path of the said fluid.

5. Device according to claim 4, characterized in that it comprises, between at least one of the said openings (13, 14) of the said sleeve and the corresponding end of the said duct (15), a connection element (22) having a truncated cone shape, the cross-section of that element (22) decreasing progressively from that end to that opening (13, 14) and that the said fan (17) is suitable for imparting to the said fluid a sufficiently great speed for the flow of the said fluid in the said space (11) comprised between the said plane faces (8, 9) to take place at a turbulent rate.

6. Device according to claim 1, characterized in that the said cooling fluid is helium.

* * * * *